(12) United States Patent
Bailey et al.

(10) Patent No.: US 12,346,529 B2
(45) Date of Patent: Jul. 1, 2025

(54) UI WORKFLOW OPTIMIZATION BASED ON EXPECTED NEXT UI INTERACTION

(71) Applicant: International Business Machines Corporation, Armonk, NY (US)

(72) Inventors: Logan Bailey, Atlanta, GA (US); Zachary A. Silverstein, Georgetown, TX (US); Jennifer M. Hatfield, Portland, OR (US); Alexander Joseph Abell, Conshohocken, PA (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 18/341,703

(22) Filed: Jun. 26, 2023

(65) Prior Publication Data

US 2024/0427469 A1 Dec. 26, 2024

(51) Int. Cl.
*G06F 3/04812* (2022.01)
*H04L 67/50* (2022.01)

(52) U.S. Cl.
CPC ........ *G06F 3/04812* (2013.01); *H04L 67/535* (2022.05)

(58) Field of Classification Search
CPC .............................. G06F 3/04812; H04L 67/535
See application file for complete search history.

(56) References Cited

U.S. PATENT DOCUMENTS

| | | | |
|---|---|---|---|
| 9,459,950 B2 | 10/2016 | Bhamidipaty | |
| 10,268,350 B2 | 4/2019 | Ligman | |
| 10,622,105 B2 | 4/2020 | Von Reden | |
| 11,443,241 B2 | 9/2022 | Mudi | |
| 2018/0144244 A1 | 5/2018 | Masoud | |
| 2019/0317805 A1* | 10/2019 | Metsch | G06N 20/00 |
| 2020/0050529 A1 | 2/2020 | Balasubramanian | |
| 2021/0110345 A1* | 4/2021 | Iyer | G06Q 10/0633 |
| 2023/0031702 A1* | 2/2023 | Li | G06V 10/82 |
| 2024/0134682 A1* | 4/2024 | Kulkarni | G06Q 10/06316 |

FOREIGN PATENT DOCUMENTS

| | | |
|---|---|---|
| CN | 113785310 A | 12/2021 |
| WO | 2019217451 A1 | 11/2019 |
| WO | 2021190984 A1 | 9/2021 |
| WO | 202263675 A1 | 3/2022 |

OTHER PUBLICATIONS

"TyperTask for Windows", Uptodown, Printed May 23, 2023, 4 pages, <https://typertask.en.uptodown.com/windows>.

* cited by examiner

*Primary Examiner* — Cao H Nguyen
(74) *Attorney, Agent, or Firm* — Eric W. Chesley

(57) ABSTRACT

In several approaches, a processor feeds an interaction by a user into a recurrent neural network (RNN) model. A processor identifies, using the RNN model trained to identify a specific workflow based on the interaction, an in-process workflow of the user. A processor predicts, using the RNN model, a next interaction of the user based on a next expected step in the in-process workflow. A processor performs at least one optimization function related to the next interaction of the user including at least one of autofocusing on a next user interface (UI) element associated with the next expected step in the in-process workflow, snapping a text cursor to the next UI element associated with the next expected step in the in-process workflow, and providing a UI prompt with a link to the next UI element associated with the next expected step in the in-process workflow.

20 Claims, 3 Drawing Sheets

UI WORKFLOW OPTIMIZATION BASED ON EXPECTED NEXT UI INTERACTION

BACKGROUND OF THE INVENTION

The present invention relates generally to the field of workflow processing, and more particularly to a user interface (UI) workflow optimization based on an expected next UI interaction.

Users often repetitively perform tasks that include specific chronological steps and interactions with a user interface (UI). While user familiarity and speed performing the task interaction steps increase with repetition, ultimately human efficiency reaches a limit and additional computer assistance may be needed to further improve.

SUMMARY

Aspects of an embodiment of the present invention disclose a method, computer program product, and computer system for an auto focal adjustment and/or auto cursor snap to next user interface (UI) element based on an expected process flow. A processor, responsive to a recurrent neural network (RNN) model being enabled for use, feeds an interaction by a user into the RNN model. A processor identifies, using the RNN model trained to identify a specific workflow based on the interaction by the user, an in-process workflow of the user. A processor predicts, using the RNN model, a next interaction of the user based on a next expected step in the in-process workflow. A processor performs at least one optimization function related to the next interaction of the user, wherein the at least one optimization function is at least one of autofocusing on a next user interface (UI) element associated with the next expected step in the in-process workflow, snapping a text cursor to the next UI element associated with the next expected step in the in-process workflow, and providing a UI prompt with a link to the next UI element associated with the next expected step in the in-process workflow.

In some embodiments of the present invention, the interaction of the user is identified using task mining.

In some embodiments of the present invention, a processor captures interactions of the user with user interface (UI) elements using task mining. A processor builds one or more workflows from the captured interactions of the user. A processor trains a RNN on the one or more workflows. A processor generates the RNN model from the trained RNN for identifying a workflow the user has initiated.

In some embodiments of the present invention, a processor iterates through the capturing step, the building step, the training step, and the generating step until a pre-defined confidence threshold for the RNN model is reached. A processor, responsive to the pre-defined confidence threshold being reached, prompts the user that the RNN model is ready for use.

In some embodiments of the present invention, responsive to identifying a manual override by the user to a different UI element than the next UI element associated with the next expected step of the in-process workflow, a processor re-trains the RNN model based on the different UI element to update a set of steps of the workflow.

In some embodiments of the present invention, a processor enables the user to set up a shortcut key for triggering the at least one optimization function.

In some embodiments of the present invention, the capturing interactions of the user with user interface (UI) elements using task mining comprises: capturing user clicks, text cursor movement of the user, user inputs and associated contextual data, and UI element interactions by the user; and capturing information associated with applications used by the user, sequence of actions performed by the user, and time taken for each action by the user.

DETAILED DESCRIPTION

Figure 1:
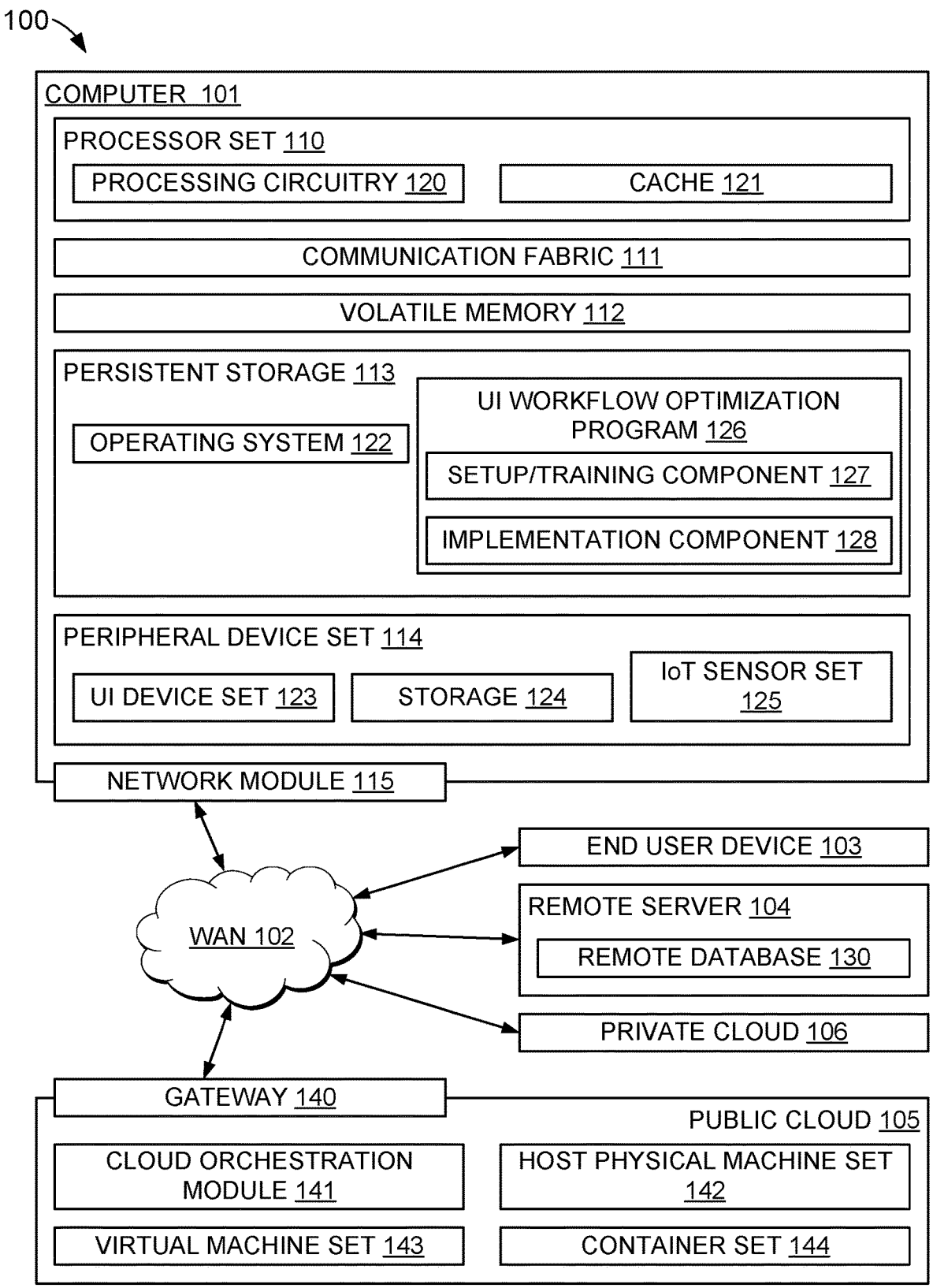
FIG. 1 is a functional block diagram illustrating a computing environment, for running a UI workflow optimization program, in accordance with an embodiment of the present invention.

Embodiments of the present invention recognize the constant need for improving workflow efficiency. When performing a workflow process involving a human computer task on a user interface (UI), embodiments of the present invention capture human computer task interaction process flow steps of a user while interacting with a UI to predict and facilitate efficiency in performing a next task in a workflow. Embodiments of the present invention provide a method and system that facilitates auto focal frame adjustment and/or pointer or text cursor snap to specific UI elements based on predicted or derived next workflow steps.

Embodiments of the present invention monitor a user's interactions at a browser and operating system (OS) level, capture user inputs through task mining, and build task workflows of which UI elements are interacted with based on the captured user inputs. Embodiments of the present invention utilize a recurrent neural network (RNN) that is trained on the task workflows to be able to identify when the user is performing one of the task workflows and which UI elements the user interacts with during the task workflows. Once a pre-defined confidence level for the RNN model predicting a user's next interaction based on a task workflow being performed is achieved, embodiments of the present invention deploy the RNN for predicting next and upcoming UI elements the user will interact with. Embodiments of the present invention perform an auto focal adjustment, pointer or text cursor snap to a next UI element, and/or provide a UI widget explaining and providing a link to a next predicted workflow step or UI element interaction.

Implementations of the invention provide a technical solution to the technical problems associated with completing computing tasks through a UI by facilitating auto focal frame adjustment and/or point or text cursor snap to a next UI element based on the trained RNN predicting a next step in a task workflow. Implementations of the invention thus provide improvements in the field of computer task workflows involving user interacting through a UI. The improvements are technical in nature because they are inextricably tied to computing and involve manipulating of UIs to improve efficiencies of computing task workflows.

Embodiments of the present invention automatically perform an auto focal adjustment, pointer or text cursor snap to a next predicted UI element, and/or provide a UI widget explaining and providing a link to a next predicted workflow step or UI element interaction. Accordingly, implementations of aspects of the present invention provide an improvement (i.e., technical solution) to a problem arising in the technical field of UIs. In particular, embodiments of the present invention train and employ a RNN to predict the next UI element a user would interact with in a workflow, and thus, embodiments of the present invention may not be performed in a human mind. Further, implementations of the present invention improve the functioning of the computer by enabling users to complete steps in a workflow quicker, resulting in less computing resources used.

Aspects of an embodiment of the present invention disclose a method, computer program product, and computer system for a UI workflow optimization based on an expected/predicted process flow. A processor, responsive to a recurrent neural network (RNN) model being enabled for use, feeds an interaction by a user into the RNN model. A processor identifies, using the RNN model trained to identify a specific workflow based on the interaction by the user, an in-process workflow of the user. A processor predicts, using the RNN model, a next interaction of the user based on a next expected step in the in-process workflow. A processor performs at least one optimization function related to the next interaction of the user, wherein the at least one optimization function is at least one of autofocusing on a next user interface (UI) element associated with the next expected step in the in-process workflow, snapping a text cursor to the next UI element associated with the next expected step in the in-process workflow, and providing a UI prompt with a link to the next UI element associated with the next expected step in the in-process workflow.

In some embodiments of the present invention, the interaction of the user is identified using task mining, which has the technical advantage of collecting contextual data associated with the interaction.

In some embodiments of the present invention, a processor captures interactions of the user with user interface (UI) elements using task mining. A processor builds one or more workflows from the captured interactions of the user. A processor trains a RNN on the one or more workflows. A processor generates the RNN model from the trained RNN for identifying a workflow the user has initiated. These embodiments have the technical effect of training an RNN for a particular user, in effect learning one or more workflows of the user that can be used predict a next interaction of the user once the RNN model is enabled for use.

In some embodiments of the present invention, a processor iterates through the capturing step, the building step, the training step, and the generating step until a pre-defined confidence threshold for the RNN model is reached. A processor, responsive to the pre-defined confidence threshold being reached, prompts the user that the RNN model is ready for use. These embodiments have the technical effect of ensuring the RNN model has reached a pre-defined confidence threshold before use to ensure accuracy in the RNN model once in use.

In some embodiments of the present invention, responsive to identifying a manual override by the user to a different UI element than the next UI element associated with the next expected step of the in-process workflow, a processor re-trains the RNN model based on the different UI element to update a set of steps of the workflow. These embodiments have the technical effect of re-training the RNN model based on variations made by the user to a workflow to ensure continued usefulness of the RNN model.

In some embodiments of the present invention, a processor enables the user to set up a shortcut key for triggering the at least one optimization function. These embodiments have the technical effect of furthering efficiencies by using a shortcut key for triggering the optimization functions.

In some embodiments of the present invention, the capturing interactions of the user with user interface (UI) elements using task mining comprises: capturing user clicks, text cursor movement of the user, user inputs and associated contextual data, and UI element interactions by the user; and capturing information associated with applications used by the user, sequence of actions performed by the user, and time taken for each action by the user.

Implementation of embodiments of the invention may take a variety of forms, and exemplary implementation details are discussed subsequently with reference to the Figures.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 1, computing environment 100 contains an example of an environment for the execution of at least some of the computer code involved in performing the inventive methods, such as UI workflow optimization program 126. In addition to block 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processors set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 116 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 116 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

UI workflow optimization program 126 operates to facilitate auto focal frame adjustment and pointer or text cursor snap to specific UI elements based on predicted or derived next workflow steps. UI elements may include, but are not limited to, widgets, input elements, and buttons, e.g., <button><input><input type="checkbox">. UI workflow optimization program 126 includes setup and training component 127 and implementation component 128. Setup and training component 127 operates to perform task mining associated with a user who has opted-in, build workflows of the user, train an RNN to identify a workflow the user is working through and predict a next UI element the user will interact with based on the identified workflow, and generate a predictive RNN model for use once a preset confidence threshold is achieved. A process flow of setup and training component 127 of UI workflow optimization program 126 is depicted and described in further detail with respect to FIG. 2. Implementation component 128 operates to improve workflow efficiency using the RNN model to predict a next UI element and autofocus on the next UI element, automatically move or snap a pointer/text cursor to the next UI element, and/or a prompt to the user with a link to the next UI element. A process flow of implementation component 128 of UI workflow optimization program 126 is depicted and described in further detail with respect to FIG. 3.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Moreover, in one or more embodiments, one or more of the components/modules may be used to provide functions in addition to and/or different than described above. Other variations are possible.

The present invention may contain various accessible data sources that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. UI workflow optimization program 126 enables the authorized and secure processing of personal data.

UI workflow optimization program 126 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. UI workflow optimization program 126 provides information regarding personal and/or confidential company data and the nature (e.g., type, scope, purpose, duration, etc.) of the processing. UI workflow optimization program 126 provides the user with copies of stored personal and/or confidential company data. UI workflow optimization program 126 allows the correction or completion of incorrect or incomplete personal and/or confidential company data. UI workflow optimization program 126 allows for the immediate deletion of personal and/or confidential company data.

Figure 2:
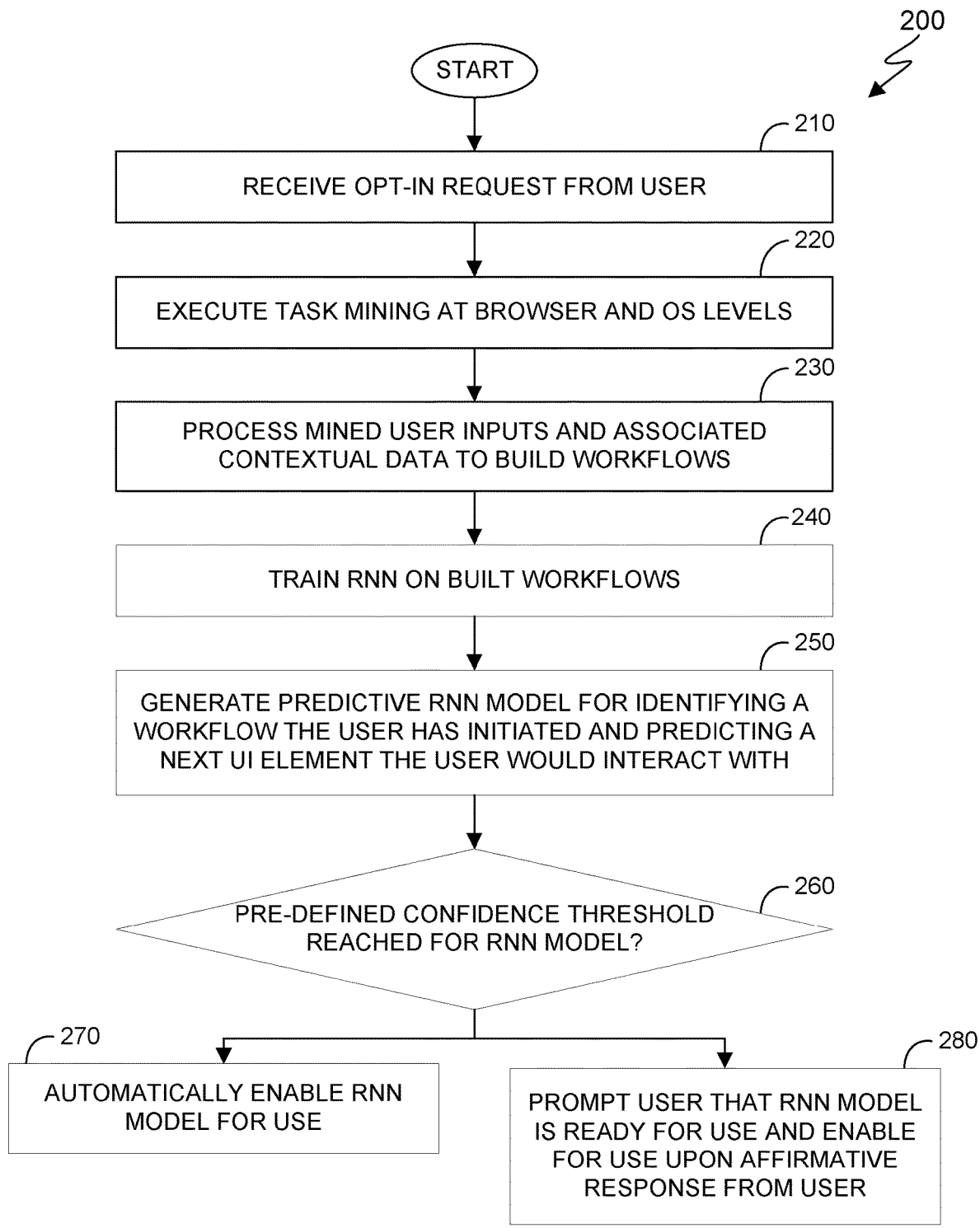
FIG. 2 is a flowchart depicting operational steps of a process flow of a setup and training component of the UI workflow optimization program, in accordance with an embodiment of the present invention.

Now referring to FIG. 2, FIG. 2 is a flowchart 200 depicting operational steps of a process flow of setup and training component 127 of UI workflow optimization program 126, on computer 101 within computing environment 100 of FIG. 1, in accordance with an embodiment of the present invention. In an embodiment, UI workflow optimization program 126 completes a one-time setup with a user to initiate task mining, build workflows of the user, and train an RNN to identify workflow the user is working through and predict a next UI element the user will interact with based on the identified workflow. The one-time setup allows UI workflow optimization program 126 to generate a predictive RNN model that UI workflow optimization program 126 uses to trigger auto focal adjustments and/or pointer/text cursor snap to a next UI element as described in more detail with respect to FIG. 3. It should be appreciated that the process depicted in FIG. 2 illustrates one possible iteration of setup and training component 127 of UI workflow optimization program 126, which may be repeated for each opt-in request received by UI workflow optimization program 126.

In step 210, UI workflow optimization program 126 receives a request from a user to opt-in. In an embodiment, UI workflow optimization program 126 receives a request from a user to opt-into UI workflow optimization program 126. For example, a user who has just downloaded a workflow optimizer software onto their user computing device can opt-in to UI workflow optimization program 126 by checking an opt-in box through a user interface on the user computing device, such as a user interface on end user device 103 of FIG. 1. In some embodiments, UI workflow optimization program 126 enables a user to set up preferences for a shortcut key (i.e., specific keyboard key) that will trigger an optimization step to be performed associated with a next predicted UI element and preferences for auto-filling out or auto-selecting dropdown options, radio button options, or other UI widgets.

In step 220, UI workflow optimization program 126 executes task mining at browser and operating system (OS) levels. In an embodiment, responsive to a user opting-in to UI workflow optimization program 126, UI workflow optimization program 126 begins executing task mining (as known to a person of skill in the art) at the browser level and OS level to monitor and capture user inputs by the user. In an embodiment, UI workflow optimization program 126, through task mining methods, can monitor and capture user clicks, cursor movement, widget interactions, etc. In an embodiment, UI workflow optimization program 126, through task mining methods, can also capture information about applications used, sequence of actions performed, time taken for each action, and any errors encountered. In an embodiment, UI workflow optimization program 126 captures user inputs and associated contextual data.

In step 230, UI workflow optimization program 126 processes the user inputs and associated contextual data to enable building of one or more workflows (i.e., process flows, task flows, etc. each comprising ordered steps) of UI elements interacted with by the user and an order in which the UI elements are interacted with. In an embodiment, UI workflow optimization program 126 builds one or more workflows of UI elements interacted with by the user and an order in which the UI elements are interacted with based on patterns, trends, associations, etc. identified from the processed user inputs and associated contextual data.

In step 240, UI workflow optimization program 126 trains a recurrent neural network (RNN) on the workflows. In an embodiment, UI workflow optimization program 126 trains a RNN on the workflows built from the processed user inputs and associated contextual data to be able to identify when a user has initiated or is in the middle of one of the workflows and the order in which UI elements are interacted with.

In step 250, from training the RNN, UI workflow optimization program 126 generates a predictive RNN model for the specific user for identifying a workflow the user is in and predicting a next UI element that the user will interact with based on the identified workflow. In an embodiment, UI workflow optimization program 126 integrates the RNN model with the user's web browser or interaction instance via OS level integrations such as through Selenium drivers, robotic process automation (RPA) level integration, and administrator commands.

In decision 260, UI workflow optimization program 126 determines whether a pre-defined confidence threshold has been reached for the predictive RNN model. In an embodiment, UI workflow optimization program 126 runs steps 220, 230, 240, and 250 until a pre-defined confidence level or threshold is achieved for the predictive RNN model. Responsive to determining the pre-defined confidence threshold has not been reached for the predictive RNN model (decision 260, NO branch), UI workflow optimization program 126 continues running steps 220, 230, 240, and 250. In some embodiments, once the pre-defined confidence threshold is achieved (decision 260, YES1 branch), UI workflow optimization program 126 automatically enables the RNN model for use, in step 270. In other embodiments, once the pre-defined confidence threshold is achieved (decision 260, YES2 branch), UI workflow optimization program 126, in step 280, prompts the user that the RNN model is ready and whether the user would like UI workflow optimization program 126 to enable the RNN model for use. In these embodiments, responsive to receiving an affirmative response from the user, UI workflow optimization program 126 enables the RNN model for use. Additionally, in some embodiments, UI workflow optimization program 126 enables the user to designate or confirms if the user designated a specific keyboard key for jumping to a predicted next UI element.

In some embodiments, UI workflow optimization program 126 further trains the RNN model to output to the user recommendations for optimizing the workflow by removing a step, adding a step, changing an order of steps, changing the way a step is completed, etc.

Figure 3:
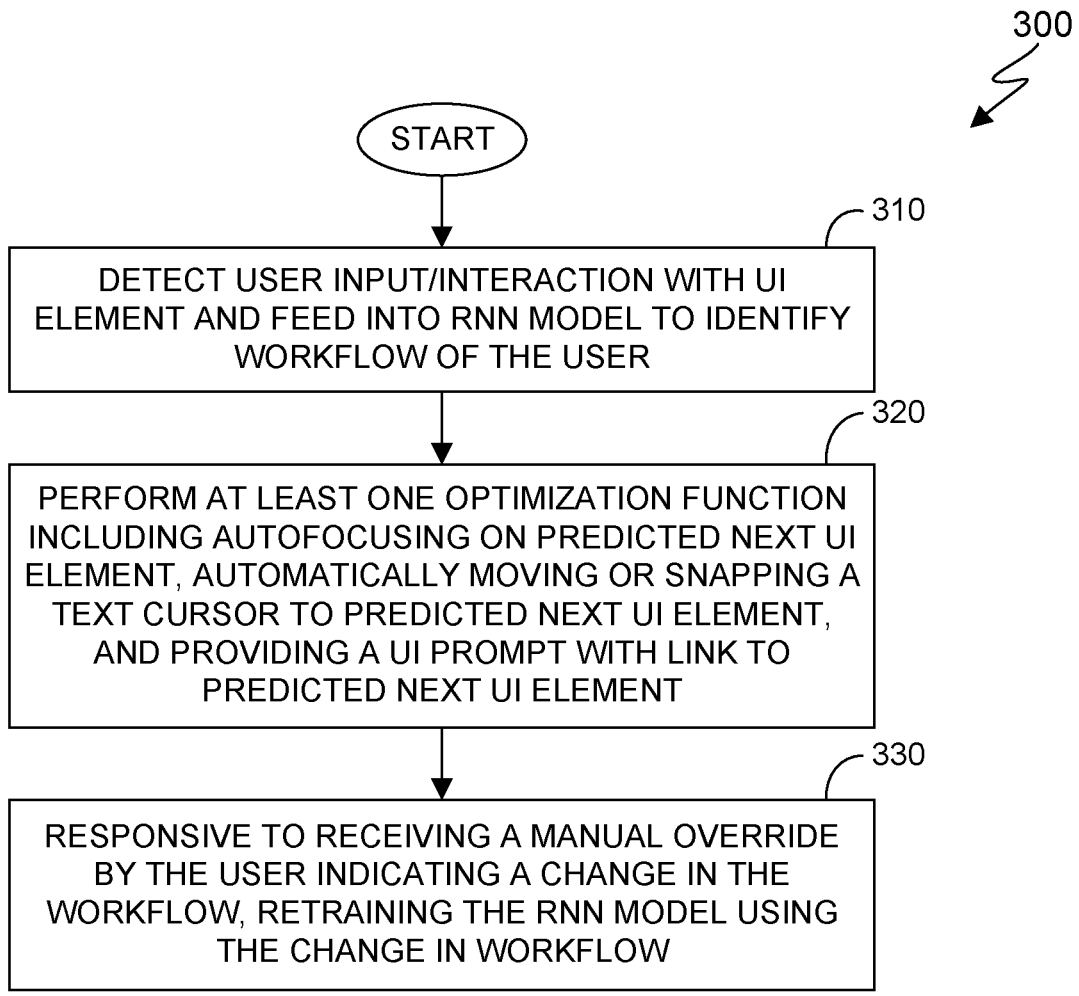
FIG. 3 is a flowchart depicting operational steps of a process flow of an implementation component of the UI workflow optimization program, for an auto focal adjustment and/or auto cursor snap to next user interface (UI) element based on an expected process flow, running on a computer of the distributed data processing environment of FIG. 1, in accordance with an embodiment of the present invention.

FIG. 3 is a flowchart 300 depicting operational steps of a process flow of implementation component 128 of UI workflow optimization program 126, for an auto focal adjustment and/or auto cursor snap to next user interface (UI) element based on an expected process flow, running on computer 101 of computing environment 100 of FIG. 1 in accordance with an embodiment of the present invention. In an embodiment, the process flow of implementation component 128 of UI workflow optimization program 126 executes on a computer (e.g., computer 101 of FIG. 1), a processor (e.g., a processor of processor set 110 of FIG. 1), and/or processing circuitry (e.g., processing circuitry of processor set 110), to improve workflow efficiency using an auto focal adjustment to a next predicted UI element, pointer/text cursor snap to a next predicted UI element, and/or a prompt to the user with link to the next predicted UI element. It should be appreciated that the process depicted in FIG. 2 illustrates one possible iteration of the process flow of implementation component 128 of UI workflow optimization program 126 once the RNN model is enabled for use during browser instances by the user.

In step 310, UI workflow optimization program 126 detects a user input and/or user interaction with a UI element. In an embodiment, UI workflow optimization program 126 detects a user input and/or user interaction with a UI element using task mining methods. In an embodiment, UI workflow optimization program 126 feeds the detected user input and/or user interaction with a UI element into the predictive RNN model for identifying a workflow the user has initiated or is working through.

In step 320, responsive to the predictive RNN model identifying a workflow the user has initiated or is working through (i.e., an in-process workflow), UI workflow optimization program 126 uses the RNN model to predict each next UI element the user would interact with and when as the user works through the workflow and perform at least one optimization step (function) to help the user move to the next UI element. In an embodiment, UI workflow optimization program 126 uses the RNN model to predict a next interaction of the user based on a next expected step in the in-process workflow. In an embodiment, UI workflow optimization program 126 performs at least one optimization function related to the next interaction of the user. The at least one optimization step may be autofocusing (i.e., enlarges, magnifies, zooms in on) on the next UI element, automatically moving the pointer or snapping the text cursor to the next UI element, and automatically providing a UI prompt (i.e., pop up or widget) with a link to the next UI element in the workflow. In some embodiments, UI workflow optimization program 126 autofocuses (i.e., enlarges, magnifies, zooms in on) on the next UI element and automatically moves the pointer or snaps the text cursor to the next UI element. In some embodiments, UI workflow optimization program 126 provides a UI prompt (i.e., pop up or widget) with a link to the next UI element in the workflow. This providing of a UI prompt is especially helpful for workflows in which the next UI element is in another browser, program, etc. on the user's computer.

In an embodiment, UI workflow optimization program 126 performs at least one of these optimizations between each step of an identified workflow based on the RNN model predicting a next UI element to be interacted with in the workflow. In some embodiments, UI workflow optimization program 126 performs the at least one optimization step in response to the user clicking a pre-defined shortcut key that triggers the at least one optimization step.

In step 330, responsive to receiving or identifying a manual override by the user, UI workflow optimization program 126 reevaluates the predictive RNN model based on the manual override by the user. In an embodiment, UI workflow optimization program 126 receives or identifies a manual override (i.e., some indication by the user that the predicted next step in the workflow was incorrect or has changed) by the user indicating a change in the workflow, in which the change can be removing a step, adding a step, or changing an order to one or more steps in the workflow. In an embodiment, UI workflow optimization program 126 identifies a manual override when the user moves to a different UI element that the predicted next UI element by the RNN model that was autofocused on, snapped to, or prompted to the user. In an embodiment, UI workflow optimization program 126 reevaluates or retrains the predictive RNN model based on the change to the workflow (i.e., the different UI element that the user interacted with).

The descriptions of the various embodiments of the present invention have been presented herein for purposes of illustration but are not intended to be exhaustive or limited to the embodiments disclosed. Many modifications and variations will be apparent to those skilled in the art. Accordingly, the appended claims are intended to encompass all such modifications and variations as fall within the true spirit and scope of the embodiments described herein.

What is claimed is:

1. A method comprising:
responsive to a recurrent neural network (RNN) model being enabled for use, inputting into the RNN model, by one or more processors, a user interaction with a user interface (UI) element of a user interface;

identifying, by the one or more processors, using the RNN model trained to identify a specific workflow based on the user interaction with the UI element of the user interface, an in-process workflow of the user;

predicting, by the one or more processors, using the RNN model, a next user interaction with the user interface based on a next expected step in the in-process workflow; and performing, by the one or more processors, at least one optimization function related to the next user interaction with the user interface, wherein the at least one optimization function is selected from the group consisting of: autofocusing on a next UI element associated with the next expected step in the in-process workflow, snapping a text cursor to the next UI element associated with the next expected step in the in-process workflow, and providing a UI prompt with a link to the next UI element associated with the next expected step in the in-process workflow.

2. The method of claim 1, wherein the user interaction with the UI element of the user interface is identified using task mining.

3. The method of claim 1, further comprising:
capturing, by the one or more processors, user interactions with UI elements of the user interface using task mining;
building, by the one or more processors, one or more workflows from the captured user interactions;
training, by the one or more processors, a RNN on the one or more workflows; and
generating, by the one or more processors, the RNN model from the trained RNN for identifying a workflow the user has initiated.

4. The method of claim 3, further comprising:
iterating, by the one or more processors, through the capturing step, the building step, the training step, and the generating step until a pre-defined confidence threshold for the RNN model is reached; and
responsive to the pre-defined confidence threshold being reached, prompting, by the one or more processors, the user that the RNN model is ready for use.

5. The method of claim 1, further comprising:
responsive to identifying a manual override by the user to a different UI element than the next UI element associated with the next expected step of the in-process workflow, re-training, by the one or more processors, the RNN model based on the different UI element to update a set of steps of the workflow.

6. The method of claim 1, further comprising:
enabling, by the one or more processors, the user to set up a shortcut key for triggering the at least one optimization function.

7. The method of claim 3, wherein capturing user interactions with the UI elements of the user interface using the task mining comprises:
capturing, by the one or more processors, user clicks, text cursor movement of the user, user inputs and associated contextual data, and UI element interactions by the user; and
capturing, by the one or more processors, information associated with applications used by the user, sequence of actions performed by the user, and time taken for each action by the user.

8. A computer program product comprising:
one or more computer readable storage media and program instructions collectively stored on the one or more computer readable storage media, the stored program instructions comprising:
program instructions to, responsive to a recurrent neural network (RNN) model being enabled for use, input into the RNN a user interaction with a user interface (UI) element of a user interface;
program instructions to identify, using the RNN model trained to identify a specific workflow based on the user interaction with the UI element of the user interface, an in-process workflow of the user;
program instructions to predict, using the RNN model, a next user interaction with the user interface based on a next expected step in the in-process workflow; and
program instructions to perform at least one optimization function related to the next user interaction with the user interface, wherein the at least one optimization function is selected from the group consisting of: autofocusing on a next UI element associated with the next expected step in the in-process workflow, snapping a text cursor to the next UI element associated with the next expected step in the in-process workflow, and providing a UI prompt with a link to the next UI element associated with the next expected step in the in-process workflow.

9. The computer program product of claim 8, wherein the user interaction with the UI element of the user interface is identified using task mining.

10. The computer program product of claim 8, further comprising:
program instructions to capture user interactions with UI elements of the user interface using task mining;
program instructions to build one or more workflows from the captured user interactions;
program instructions to train a RNN on the one or more workflows; and
program instructions to generate the RNN model from the trained RNN for identifying a workflow the user has initiated.

11. The computer program product of claim 10, further comprising:
program instructions to iterate through the capturing step, the building step, the training step, and the generating step until a pre-defined confidence threshold for the RNN model is reached; and
program instructions to, responsive to the pre-defined confidence threshold being reached, prompt the user that the RNN model is ready for use.

12. The computer program product of claim 8, further comprising:
program instructions to, responsive to identifying a manual override by the user to a different UI element than the next UI element associated with the next expected step of the in-process workflow, re-train the RNN model based on the different UI element to update a set of steps of the workflow.

13. The computer program product of claim 8, further comprising:
program instructions to enable the user to set up a shortcut key for triggering the at least one optimization function.

14. The computer program product of claim 10, wherein the program instructions to capture user interactions with the UI elements of the user interface using the task mining comprise:

program instructions to capture user clicks, text cursor movement of the user, user inputs and associated contextual data, and UI element interactions by the user; and program instructions to capture information associated with applications used by the user, sequence of actions performed by the user, and time taken for each action by the user.

15. A computer system comprising:

one or more computer processors;

one or more computer readable storage media;

program instructions collectively stored on the one or more computer readable storage media for execution by at least one of the one or more computer processors, the stored program instructions comprising:

program instructions to, responsive to a recurrent neural network (RNN) model being enabled for use, feed input into the RNN model a user interaction with a user interface (UI) element of a user interface;

program instructions to identify, using the RNN model trained to identify a specific workflow based on the user interaction with the UI element of the user interface, an in-process workflow of the user;

program instructions to predict, using the RNN model, a next user interaction with the user interface based on a next expected step in the in-process workflow; and program instructions to perform at least one optimization function related to the next user interaction with the user interface, wherein the at least one optimization function is selected from the group consisting of: autofocusing on a next UI element associated with the next expected step in the in-process workflow, snapping a text cursor to the next UI element associated with the next expected step in the in-process workflow, and providing a UI prompt with a link to the next UI element associated with the next expected step in the in-process workflow.

16. The computer system of claim 15, further comprising:

program instructions to capture user interactions with UI elements of the user interface using task mining;

program instructions to build one or more workflows from the captured user interactions;

program instructions to train a RNN on the one or more workflows; and program instructions to generate the RNN model from the trained RNN for identifying a workflow the user has initiated.

17. The computer system of claim 16, further comprising:

program instructions to iterate through the capturing step, the building step, the training step, and the generating step until a pre-defined confidence threshold for the RNN model is reached; and program instructions to, responsive to the pre-defined confidence threshold being reached, prompt the user that the RNN model is ready for use.

18. The computer system of claim 15, further comprising:

program instructions to, responsive to identifying a manual override by the user to a different UI element than the next UI element associated with the next expected step of the in-process workflow, re-train the RNN model based on the different UI element to update a set of steps of the workflow.

19. The computer system of claim 15, further comprising:

program instructions to enable the user to set up a shortcut key for triggering the at least one optimization function.

20. The computer system of claim 16, wherein the program instructions to capture user interactions with the UI elements of the user interface using the task mining comprise:

program instructions to capture user clicks, text cursor movement of the user, user inputs and associated contextual data, and UI element interactions by the user; and program instructions to capture information associated with applications used by the user, sequence of actions performed by the user, and time taken for each action by the user.

* * * * *